United States Patent
Evans et al.

(10) Patent No.: US 12,348,874 B2
(45) Date of Patent: Jul. 1, 2025

(54) APPARATUS AND METHOD OF OBTAINING AN IMAGE OF A SAMPLE IN MOTION

(71) Applicants: ILLUMINA, INC., San Diego, CA (US); ILLUMINA CAMBRIDGE LIMITED, Cambridge (GB)

(72) Inventors: Geraint Evans, Cambridge (GB); Stanley Hong, Palo Alto, CA (US); Merek Siu, Alameda, CA (US); Shaoping Lu, Palo Alto, CA (US); John Moon, Rancho Santa Fe, CA (US)

(73) Assignees: ILLUMINA, INC., San Diego, CA (US); ILLUMINA CAMBRIDGE LIMITED, Cambridge (GB)

( * ) Notice: Subject to any disclaimer, the term of this patent is extended or adjusted under 35 U.S.C. 154(b) by 897 days.

(21) Appl. No.: 17/513,042

(22) Filed: Oct. 28, 2021

(65) Prior Publication Data
US 2022/0150394 A1 May 12, 2022

Related U.S. Application Data

(60) Provisional application No. 63/110,720, filed on Nov. 6, 2020.

(51) Int. Cl.
| | | |
|---|---|---|
| H04N 23/72 | (2023.01) | |
| G02B 21/00 | (2006.01) | |
| G06V 20/69 | (2022.01) | |
| H04N 23/56 | (2023.01) | |

(52) U.S. Cl.
CPC ......... *H04N 23/72* (2023.01); *G02B 21/0032* (2013.01); *G02B 21/0036* (2013.01); *G02B 21/008* (2013.01); *G06V 20/693* (2022.01); *H04N 23/56* (2023.01)

(58) Field of Classification Search
CPC ............ G01N 21/6458; G02B 21/0032; G02B 21/0036; G02B 21/008; G02B 21/367; G06V 10/141; G06V 10/60; G06V 10/62; G06V 20/693; H04N 23/56; H04N 23/685; H04N 23/72; H04N 23/74
USPC ......................................................... 348/79
See application file for complete search history.

(56) References Cited

U.S. PATENT DOCUMENTS

| | | |
|---|---|---|
| 7,329,860 B2 | 2/2008 | Feng et al. |
| 7,791,013 B2 | 9/2010 | Wang et al. |
| 8,241,573 B2 | 8/2012 | Banerjee et al. |
| 8,481,903 B2 | 7/2013 | Triener et al. |
| 9,745,625 B2 | 8/2017 | Chan |
| 9,917,990 B2 | 3/2018 | Staker et al. |
| 10,227,636 B2 | 3/2019 | Segale et al. |

(Continued)

OTHER PUBLICATIONS

Chalfoun, Joe, et al. "MIST: accurate and scalable microscopy image stitching tool with stage modeling and error minimization." *Scientific reports* 7.1 (2017): 4988.

*Primary Examiner* — Kathleen M Walsh
(74) *Attorney, Agent, or Firm* — FROST BROWN TODD LLP

(57) ABSTRACT

A method is used to generate an analysis image of a moving sample based on one or more exposures. An illumination source illuminates a field of view of a camera for one or more pulses while the sample moves through the field of view. The distance moved by the sample during each of these one or more pulses may be less than the size of one pixel in an image captured by the camera.

16 Claims, 9 Drawing Sheets

(56) References Cited

U.S. PATENT DOCUMENTS

| | | |
|---|---|---|
| 10,585,296 B2 | 3/2020 | Owens et al. |
| 2002/0163715 A1 | 11/2002 | Engelhardt et al. |
| 2010/0309308 A1* | 12/2010 | Saphier .............. G01N 21/8851 |
| | | 382/145 |
| 2014/0087474 A1 | 3/2014 | Huber |
| 2014/0176694 A1 | 6/2014 | Mermelstein et al. |
| 2014/0199209 A1 | 7/2014 | Chan |
| 2014/0226866 A1* | 8/2014 | Crandall ............ G01N 21/6428 |
| | | 382/107 |
| 2021/0278654 A1* | 9/2021 | Gedraitis ............. G02B 21/367 |

* cited by examiner

APPARATUS AND METHOD OF OBTAINING AN IMAGE OF A SAMPLE IN MOTION

CROSS REFERENCE TO RELATED APPLICATIONS

This claims the benefit of U.S. provisional patent application 63/110,720, entitled "Apparatus and Method of Obtaining an Image of a Sample in Motion," filed on Nov. 6, 2020, which is incorporated by reference herein in its entirety.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

For an object to be imaged, photons must be collected while that object is in the field of view of an imaging device. This, in turn, requires the object to be illuminated. When the object to be imaged is only in the field of view for a limited time, an imaging system must ensure that the energy applied through illumination during the time the object is in the field of view is sufficient for the necessary photons to be collected. High precision motion stages, time delay integration (TDI) cameras, and diode pumped solid state (DPSS) lasers are among the components that have been used to achieve this objective.

SUMMARY

Examples disclosed herein are directed to techniques for illumination of objects, and focuses particularly on techniques for illumination of samples of genetic material to be sequenced.

An implementation relates to a machine comprising a camera to capture images comprising pixels, each of which has a pixel size corresponding to a distance on a stage in a direction of movement of a sample container. The machine further comprises the stage to move the sample container relative to a field of view of the camera which overlaps the stage, wherein the sample container comprises an array of features having a pitch length in the direction of movement of the sample container. The machine further comprises an illumination source to illuminate the field of view of the camera. The machine further comprises a controller to obtain an analysis image by performing acts comprising, while a feature from the array of features is in, and is in motion relative to, the field of view of the camera, obtaining one or more exposures of the feature. Obtaining one or more exposures of the feature may be performed by, for each of the one or more exposures, performing acts. The acts may comprise exposing a sensor of the camera to illumination for a first duration and, during a period having a second duration which takes place while the sensor of the camera is exposed to illumination, illuminating the field of view of the camera with the illumination source. In such a machine, the feature's displacement in the field of view of the camera from beginning to end of the period having the second duration is less than or equal to the pitch length in the direction of movement of the sample container.

In some implementations, in a machine such as described in the preceding, the feature's displacement in the direction of movement of the sample container in the field of view of the camera from beginning to end of the period having the second duration may be less than or equal to the pixel size.

In some implementations of a machine such as that described in either of the preceding two paragraphs of this summary, obtaining one or more exposures of the feature comprises obtaining a plurality of exposures of the feature. The acts the controller is to perform comprise, overlaying the plurality of exposures of the feature based on translating one or more of the plurality of exposures of the feature.

In some implementations of a machine such as described in the preceding paragraph of this summary, the acts the controller is to perform comprise, for each exposure, obtaining a corresponding value for the sample container's position when the field of view of the camera was illuminated with the illumination source. In some such implementations, the controller is to translate one or more of the plurality of exposures of the feature based on differences between the exposures' corresponding values for the sample container's position.

In some implementations of a machine such as described in the preceding paragraph of this summary, the machine comprises an encoder to provide values for the sample container's position. In some such implementations, the controller is to, for each exposure, obtain the corresponding value for the sample container's position when the field of view of the camera was illuminated with the illumination source from the encoder.

In some implementations of a machine such as described in the preceding paragraph of this summary, the encoder has a resolution to distinguish distances smaller than the distance on the stage corresponding to the pixel size and overlaying the plurality of exposures of the feature comprises co-registering each of the plurality of exposures at the resolution of the encoder.

In some implementations of a machine such as described in the preceding paragraph of this summary, co-registering each of the plurality of exposures at the resolution of the encoder comprises, for at least one of the one or more exposures, obtaining a frequency space representation by taking a fast Fourier transform of the exposure. Co-registering each of the plurality of exposures at the resolution of the encoder further comprises, for at least one of the one or more exposures, translating the frequency space representation by the distance which is not a whole number multiple of the distance on the stage corresponding to the pixel size. Co-registering each of the plurality of exposures at the resolution of the encoder further comprises, for at least one of the one or more exposures, performing an inverse fast Fourier transform of the translated frequency space representation.

In some implementations of a machine such as described in either of the preceding two paragraphs of this summary, co-registering each of the plurality of exposures at the resolution of the encoder comprises, for each of the plurality of exposures: upsampling that exposure to the resolution of the encoder based on interpolating data between pixels, and translating one or more of the exposures after upsampling.

In some implementations of a machine such as described in any of the preceding paragraphs of this summary, the sample container may comprise a plurality of fiducial points, and the controller may be to translate one or more of the plurality of exposures of the features based on differences in location of the fiducial points between exposures.

In some implementations of a machine such as described in any of the preceding paragraphs of this summary, the analysis image comprises a plurality of pixels, each having a first bit depth. In some such implementations, each of the plurality of exposures comprises a plurality of pixels, each of which has a second bit depth which is less than the first bit depth.

In some implementations of a machine such as described in the preceding paragraph, each pixel comprised by each image captured by the camera has a third bit depth, wherein the third bit depth is greater than the second bit depth. Obtaining the plurality of exposures of the exposure comprises, for each exposure, capturing an image with the camera while the field of view of the camera is illuminated by the illumination source; and truncating a number of most significant bits of the pixels from the image captured by the camera, wherein the truncated number of most significant bits is equal to the difference between the third bit depth and the second bit depth In some implementations of a machine such as described in any of the preceding paragraphs of this summary, a threshold illumination energy dose is required for imaging the feature. For each of the one or more exposures of the feature, illuminating the field of view of the camera with the illumination source comprises activating the illumination source at a power which when multiplied by the second duration, provides an individual exposure energy dose less than the threshold illumination energy dose for imaging the feature, and when multiplied by the second duration and multiplied by the number of exposures in the plurality of exposures, provides a collective exposure energy dose greater than the threshold illumination energy dose for imaging the feature.

In some implementations of a machine such as described in any of the preceding paragraphs of this summary, the acts the controller is to perform comprise obtaining an image of a reference object with the camera, wherein the reference object comprises a plurality of features having known locations. The acts the controller is to perform further comprise creating a distortion map by performing acts comprising comparing the known locations of the plurality of features comprised by the reference object with apparent locations of the plurality of features in the image of the reference object, and applying the distortion map to each of the one or more exposures of the feature.

In some implementations of a machine such as described in any of the preceding paragraphs of this summary, the stage is mounted on a frame of the machine using ball bearings, the camera is to capture images using complementary metal-oxide-semiconductor sensors, and the illumination source is a diode laser.

In some implementations of a machine such as described in any of the preceding paragraphs of this summary, the feature is a nanowell.

In some implementations of a machine such as described in any of the preceding paragraphs of this summary, the analysis image is one of a plurality of analysis images; the controller is to perform a plurality of sequencing cycles, wherein each analysis image from the plurality of analysis images corresponds to a single sequencing cycle; the controller is to determine a cluster polynucleotide for each feature in the sample container based on the plurality of analysis images; and the controller is to determine a complete polynucleotide for a sample associated with the sample container based on the cluster polynucleotides determined for the features from the sample container.

In some implementations of a machine such as described in any of the preceding paragraphs of this summary, the array of features comprised by the sample container has a pitch perpendicular to the direction of movement of the sample container which is less than the pitch in the direction of movement of the sample container.

In some implementations of a machine such as described in any of the preceding paragraphs of this summary, the machine comprises a motor to counteract movement of the stage by translating the field of view of the camera in the direction of movement of the sample container during the period having the second duration.

Another implementation relates to a method comprising translating, in a direction of movement, a feature on a stage relative to a field of view of a camera, wherein the camera has a pixel size corresponding to a distance in the direction of movement on the stage, wherein the feature is comprised by an array of features in a sample container, the array of features having a pitch length in the direction of movement. The method further comprises, generating an analysis image by performing acts comprising, while the feature is in, and is in motion relative to, the field of view of the camera, obtaining one or more exposures of the feature by, for each of the one or more exposures, performing acts. Such acts comprise exposing a sensor of the camera to illumination for a first duration; and during a period having a second duration and which takes place while the sensor of the camera is exposed to illumination, illuminating the field of view of the camera with an illumination source. In such a method, the feature's displacement in the field of view of the camera from beginning to end of the period having the second duration is less than or equal to the pitch length in the direction of movement.

In some implementations, in a method such as described in the preceding paragraph of this summary, the feature's displacement in the direction of movement from beginning to end of the period having the second duration is less than or equal to the pixel size.

In some implementations, in a method such as described in either of the preceding two paragraphs of this summary obtaining one or more exposures of the feature comprises obtaining a plurality of exposures of the feature. The method further comprises overlaying the plurality of exposures of the feature to create the analysis image of the feature by performing acts comprising translating one or more of the plurality of exposures of the feature.

In some implementations, in a method such as described in the preceding paragraph, the method comprises, for each exposure obtaining a corresponding value for the sample container's position when the field of view of the camera was illuminated with the illumination source; and translating one or more of the plurality of exposures of the feature based on differences between the exposures' corresponding values for the sample container's position.

In some implementations, in a method such as described in the preceding paragraph, for each exposure the corresponding value for the sample container's position when the field of view of the camera was illuminated with the illumination source is obtained from an encoder.

In some implementations, in a method such as described in the preceding paragraph, the encoder has a resolution to distinguish distances smaller than the distance on the stage corresponding to the pixel size, and overlaying the plurality of exposures of the spot comprises co-registering each of the plurality of exposures at the resolution of the encoder.

In some implementations, in a method such as described in the preceding paragraph of this summary, co-registering each of the plurality of exposures at the resolution of the encoder comprises, for at least one of the one or more exposures, obtaining a frequency space representation by taking a fast Fourier transform of the exposure. Co-registering each of the plurality of exposures at the resolution of the enclosure further comprises, for at least one of the one or more exposures, translating the frequency space representation by the distance which is not a whole number multiple of the distance on the stage corresponding to the pixel size; and performing an inverse fast Fourier transform of the translated frequency space representation.

In some implementations, in a method such as described in any of the preceding two paragraphs, co-registering each of the plurality of exposures comprises, for each of the plurality of exposures, upsampling that exposure to the resolution of the encoder based on interpolating data between pixels, and translating one or more of the exposures after upsampling.

In some implementations, in a method such as described in any of the preceding paragraphs of this summary, the sample container comprises a plurality of fiducial points, and the method comprises translating one or more of the plurality of exposures of the feature based on differences in location of the fiducial points between exposures.

In some implementations, in a method such as described in any of the preceding paragraphs of this summary, the analysis image comprises a plurality of pixels, each having a first bit depth; and each of the plurality of exposures comprises a plurality of pixels, each of which has a second bit depth, wherein the second bit depth is less than the first bit depth.

In some implementations, in a method such as described in the preceding paragraph of this summary, each pixel comprised by each image captured by the camera has third bit depth, wherein the third bit depth is greater than the second bit depth. Additionally, obtaining the plurality of exposures of the feature comprises, for each exposure, capturing an image with the camera while the field of view of the camera is illuminated by the illumination source; and truncating a number of most significant bits of the pixels from the image captured by the camera, wherein the truncated number of most significant bits is equal to the difference between the third bit depth and the second bit depth.

In some implementations, in a method such as described in any of the preceding paragraphs of this summary, a threshold illumination energy dose is required for imaging the feature. Additionally, in such a method, for each of the one or more exposures of the feature, illuminating the field of view of the camera with the illumination source comprises activating the illumination source at a power which, when multiplied by the second duration, provides an individual exposure energy dose less than the threshold illumination energy dose for imaging the feature; and, when multiplied by the second duration and multiplied by the number of exposures in the plurality of exposures, provides a collective exposure energy dose greater than the threshold illumination energy dose for imaging the feature.

In some implementations, in a method such as described in any of the preceding paragraphs of this summary, the method comprises obtaining an image of a reference object with the camera, wherein the reference object comprises a plurality of features having known locations. The method may further comprise creating a distortion map by performing acts comprising comparing the known locations of the plurality of features comprised by the reference object with apparent locations of the plurality of features in the image of the reference object. The method may further comprise applying the distortion map to each of the one or more exposures of the feature.

In some implementations, in a method such as described in any of the preceding paragraphs of this summary, the stage is mounted on a stationary frame using ball bearings, the camera is to capture images using complimentary metal-oxide-semiconductor sensors, and the illumination source is a diode laser.

In some implementations, in a method such as described in any of the preceding paragraphs of this summary, the feature is a nanowell.

In some implementations, in a method such as described in any of the preceding paragraphs of this summary, the analysis image is one of a plurality of analysis images. In some such implementations, the method further comprises performing a plurality of sequencing cycles, wherein each analysis image from the plurality of analysis images corresponds to a single sequencing cycle; determining a cluster polynucleotide for each feature in the sample container based on the plurality of analysis images; and determining a complete polynucleotide for a sample associated with the sample container based on the cluster polynucleotides determined for the features from the sample container.

In some implementations, in a method such as described in any of the preceding paragraphs of this summary, the array of features comprised by the sample container has a pitch perpendicular to the direction of movement of the sample container which is less than the pitch in the direction of movement of the sample container.

In some implementations, a method such as described in any of the preceding paragraphs of this summary, the method comprises a motor counteracting movement of the stage by translating the field of view of the camera in the direction of movement during the period having the second duration.

Another implementation relates to a machine comprising a stage to move a sample relative to a field of view of a camera which overlaps the stage. The machine further comprises the camera to capture images comprising pixels, each of which has a pixel size corresponding to a distance on the stage. The machine further comprises an illumination source to illuminate the field of view of the camera. The machine further comprises means for obtaining an analysis image of a continuously moving sample using pulsed illumination.

In some implementations, in a machine such as described in the preceding paragraph of this summary, the means for obtaining the analysis image of the continuously moving sample using pulsed illumination comprises means for translating and overlaying multiple sub-threshold exposures.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any protection provided by this document or any related document, which scope is defined by the respective document's claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various examples, is described in detail with reference to the following figures. The figures are provided for purposes of illustration only and merely depict typical or example implementations.

The figures are not exhaustive and do not limit the present disclosure to the precise form disclosed.

DETAILED DESCRIPTION

As used herein to refer to a sample, the term "spot" or "feature" is intended to mean a point or area in a pattern that may be distinguished from other points or areas according to relative location. An individual spot may include one or more molecules of a particular type. For example, a spot may include a single target nucleic acid molecule having a particular sequence or a spot may include several nucleic acid molecules having the same sequence (and/or complementary sequence, thereof).

As used herein to refer to a spot or feature in connection with a direction, the term "pitch" is intended to mean the separation of the spot or feature from other spots or features in the direction. For example, if a sample container has an array of features which are separated from each other by 650 nm in the direction that the container would be moved during imaging, then the "pitch" of the features in that direction may be referred to as being 650 nm.

As used herein, the term "xy plane" is intended to mean a 2 dimensional area defined by straight line axes x and y in a Cartesian coordinate system. When used in reference to a detector and an object observed by the detector, the area may be further specified as being orthogonal to the direction of observation between the detector and object being detected. When used herein to refer to a line scanner, the term "y direction" refers to the direction of scanning.

As used herein, the term "z coordinate" is intended to mean information that specifies the location of a point, line or area along an axes that is orthogonal to an xy plane. In particular implementations, the z axis is orthogonal to an area of an object that is observed by a detector. For example, the direction of focus for an optical system may be specified along the z axis.

As used herein, the term "scan a line" is intended to mean detecting a 2-dimensional cross-section in an xy plane of an object, the cross-section being rectangular or oblong, and causing relative movement between the cross-section and the object. For example, in the case of fluorescence imaging an area of an object having rectangular or oblong shape may be specifically excited (at the exclusion of other areas) and/or emission from the area may be specifically acquired (at the exclusion of other areas) at a given time point in the scan.

Implementations disclosed herein are directed to illumination of objects to be imaged while in motion. Illumination may be provided for one or more brief intervals, and data corresponding to multiple illumination brief intervals may be combined to generate an image.

Figure 1:
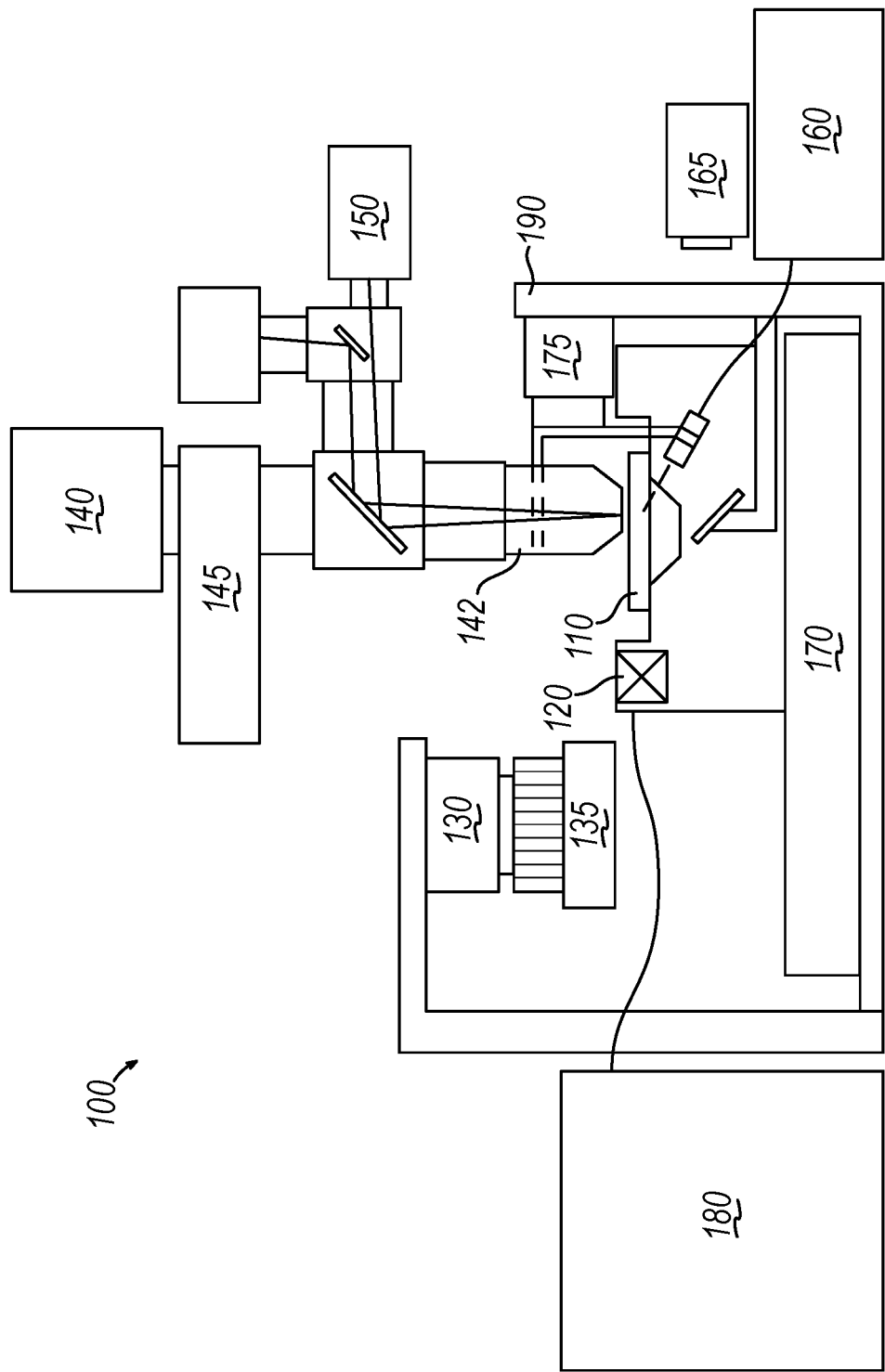
FIG. 1 illustrates, in one example, a generalized block diagram of an example image scanning system with which systems and methods disclosed herein may be implemented.

FIG. 1 is an example imaging system 100 in which the technology disclosed herein may be implemented. The example imaging system 100 may include a device for obtaining or producing an image of a sample. The example outlined in FIG. 1 shows an example imaging configuration of a backlight design implementation. It should be noted that although systems and methods may be described herein from time to time in the context of example imaging system 100, these are only examples with which implementations of the illumination and imaging techniques disclosed herein may be implemented.

As may be seen in the example of FIG. 1, subject samples are located on sample container 110 (e.g., a flow cell as described herein), which is positioned on a sample stage 170 mounted on a frame 190 under an objective lens 142. Light source 160 and associated optics direct a beam of light, such as laser light, to a chosen sample location on the sample container 110. The sample fluoresces and the resultant light is collected by the objective lens 142 and directed to an image sensor of camera system 140 to detect the florescence. Sample stage 170 is moved relative to objective lens 142 to position the next sample location on sample container 110 at the focal point of the objective lens 142. Movement of sample stage 170 relative to objective lens 142 may be achieved by moving the sample stage itself, the objective lens, some other component of the imaging system, or any combination of the foregoing. Further implementations may also include moving the entire imaging system over a stationary sample.

Fluid delivery module or device 180 directs the flow of reagents (e.g., fluorescently labeled nucleotides, buffers, enzymes, cleavage reagents, etc.) to (and through) sample container 110 and waste valve 120. Sample container 110 may include one or more substrates upon which the samples are provided. For example, in the case of a system to analyze a large number of different nucleic acid sequences, sample container 110 may include one or more substrates on which nucleic acids to be sequenced are bound, attached or associated. In various implementations, the substrate may include any inert substrate or matrix to which nucleic acids may be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the sample container 110.

In some implementations, the sample container 110 may include a biological sample that is imaged using one or more fluorescent dyes. For example, in a particular implementation the sample container 110 may be implemented as a patterned flow cell including a translucent cover plate, a substrate, and a liquid sandwiched therebetween, and a biological sample may be located at an inside surface of the translucent cover plate or an inside surface of the substrate. The flow cell may include a large number (e.g., thousands, millions, or billions) of wells or other types of spots (e.g., pads, divots) that are patterned into a defined array (e.g., a hexagonal array, rectangular array, etc.) into the substrate. Each spot may form a cluster (e.g., a monoclonal cluster) of a biological sample such as DNA, RNA, or another genomic material which may be sequenced, for example, using sequencing by synthesis. The flow cell may be further divided into a number of spaced apart lanes (e.g., eight lanes), each lane including a hexagonal array of clusters. Example flow cells that may be used in implementations disclosed herein are described in U.S. Pat. No. 8,778,848.

The system also comprises temperature station actuator 130 and heater/cooler 135 that may optionally regulate the temperature of conditions of the fluids within the sample container 110. Camera system 140 may be included to monitor and track the sequencing of sample container 110. Camera system 140 may be implemented, for example, as a charge-coupled device (CCD) camera (e.g., a time delay integration (TDI) CCD camera), which may interact with various filters within filter switching assembly 145, objective lens 142, and focusing laser/focusing laser assembly 150. Camera system 140 is not limited to a CCD camera and other cameras and image sensor technologies may be used. In particular implementations, the camera sensor may have a pixel size between about 5 and about 15 µm, though other pixel sizes, such as 2.4 µm may also be used in some cases.

Output data from the sensors of camera system 140 may be communicated to a real time analysis module (not shown) that may be implemented as a software application that analyzes the image data (e.g., image quality scoring), reports or displays the characteristics of the laser beam (e.g., focus, shape, intensity, power, brightness, position) to a graphical user interface (GUI), and, as further described below, dynamically corrects distortion in the image data.

Light source 160 (e.g., an excitation laser within an assembly optionally comprising multiple lasers) or other light source may be included to illuminate fluorescent sequencing reactions within the samples via illumination through a fiber optic interface (which may optionally comprise one or more re-imaging lenses, a fiber optic mounting, etc.). Low watt lamp 165 and focusing laser 150 also presented in the example shown. In some implementations focusing laser 150 may be turned off during imaging. In other implementations, an alternative focus configuration may include a second focusing camera (not shown), which may be a quadrant detector, a Position Sensitive Detector (PSD), or similar detector to measure the location of the scattered beam reflected from the surface concurrent with data collection.

Although illustrated as a backlit device, other examples may include a light from a laser or other light source that is directed through the objective lens 142 onto the samples on sample container 110. Sample container 110 may be ultimately mounted on a sample stage 170 to provide movement and alignment of the sample container 110 relative to the objective lens 142. The sample stage may have one or more actuators to allow it to move in any of three dimensions. For example, in terms of the Cartesian coordinate system, actuators may be provided to allow the stage to move in the X, Y and Z directions relative to the objective lens. This may allow one or more sample locations on sample container 110 to be positioned in optical alignment with objective lens 142.

A focus (z-axis) component 175 is shown in this example as being included to control positioning of the optical components relative to the sample container 110 in the focus direction (typically referred to as the z axis, or z direction). Focus component 175 may include one or more actuators physically coupled to the optical stage or the sample stage, or both, to move sample container 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators may move the stage in the z-direction while maintaining the sample stage in the same plane (e.g., maintaining a level or horizontal attitude, perpendicular to the optical axis). The one or more actuators may also tilt the stage. This may be done, for example, so that sample container 110 may be leveled dynamically to account for any slope in its surfaces.

Focusing of the system generally refers to aligning the focal plane of the objective lens with the sample to be imaged at the chosen sample location. However, focusing may also refer to adjustments to the system to obtain a desired characteristic for a representation of the sample such as, for example, a desired level of sharpness or contrast for an image of a test sample. Because the usable depth of field of the focal plane of the objective lens may be small (sometimes on the order of 1 µm or less), focus component 175 closely follows the surface being imaged. Because the sample container is not perfectly flat as fixtured in the instrument, focus component 175 may be set up to follow this profile while moving along in the scanning direction (herein referred to as the y-axis).

The light emanating from a test sample at a sample location being imaged may be directed to one or more detectors of camera system 140. An aperture may be included and positioned to allow only light emanating from the focus area to pass to the detector. The aperture may be included to improve image quality by filtering out components of the light that emanate from areas that are outside of the focus area. Emission filters may be included in filter switching assembly 145, which may be selected to record a determined emission wavelength and to cut out any stray laser light.

Figure 6:
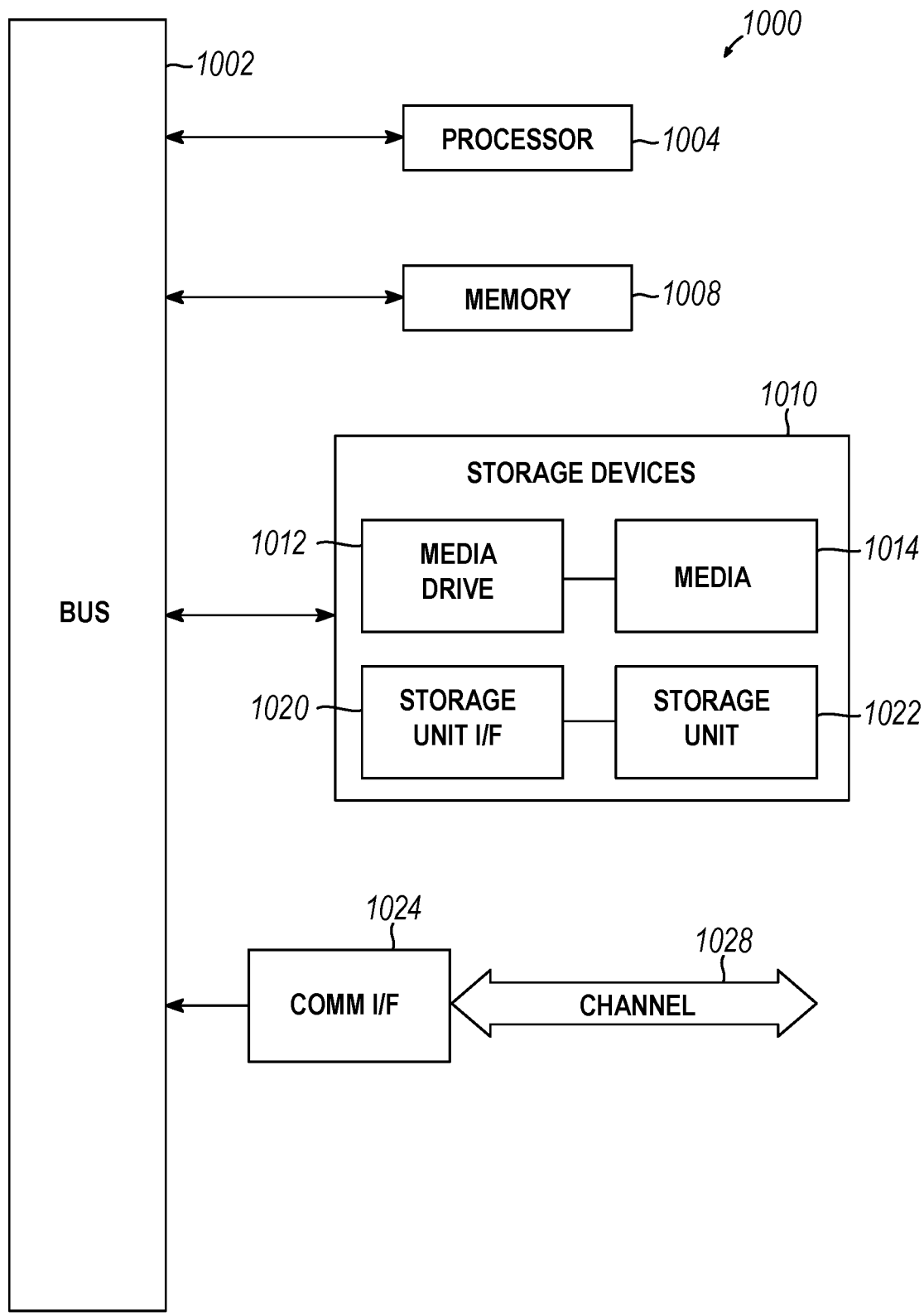
FIG. 6 illustrates an example computing module that may be used to implement various features of implementations described in the present disclosure.

Although not illustrated, a controller, which may be implemented as a computing module such as discussed infra in the context of FIG. 6, may be provided to control the operation of the scanning system. The controller may be implemented to control aspects of system operation such as, for example, focusing, stage movement, and imaging operations. In various implementations, the controller may be implemented using hardware, algorithms (e.g., machine executable instructions), or a combination of the foregoing. For example, in some implementations the controller may include one or more CPUs or processors with associated memory. As another example, the controller may comprise hardware or other circuitry to control the operation, such as a computer processor and a non-transitory computer readable medium with machine-readable instructions stored thereon. For example, this circuitry may include one or more of the following: field programmable gate array (FPGA), application specific integrated circuit (ASIC), programmable logic device (PLD), complex programmable logic device (CPLD), a programmable logic array (PLA), programmable array logic (PAL) or other similar processing device or circuitry. As yet another example, the controller may comprise a combination of this circuitry with one or more processors.

Figure 2:
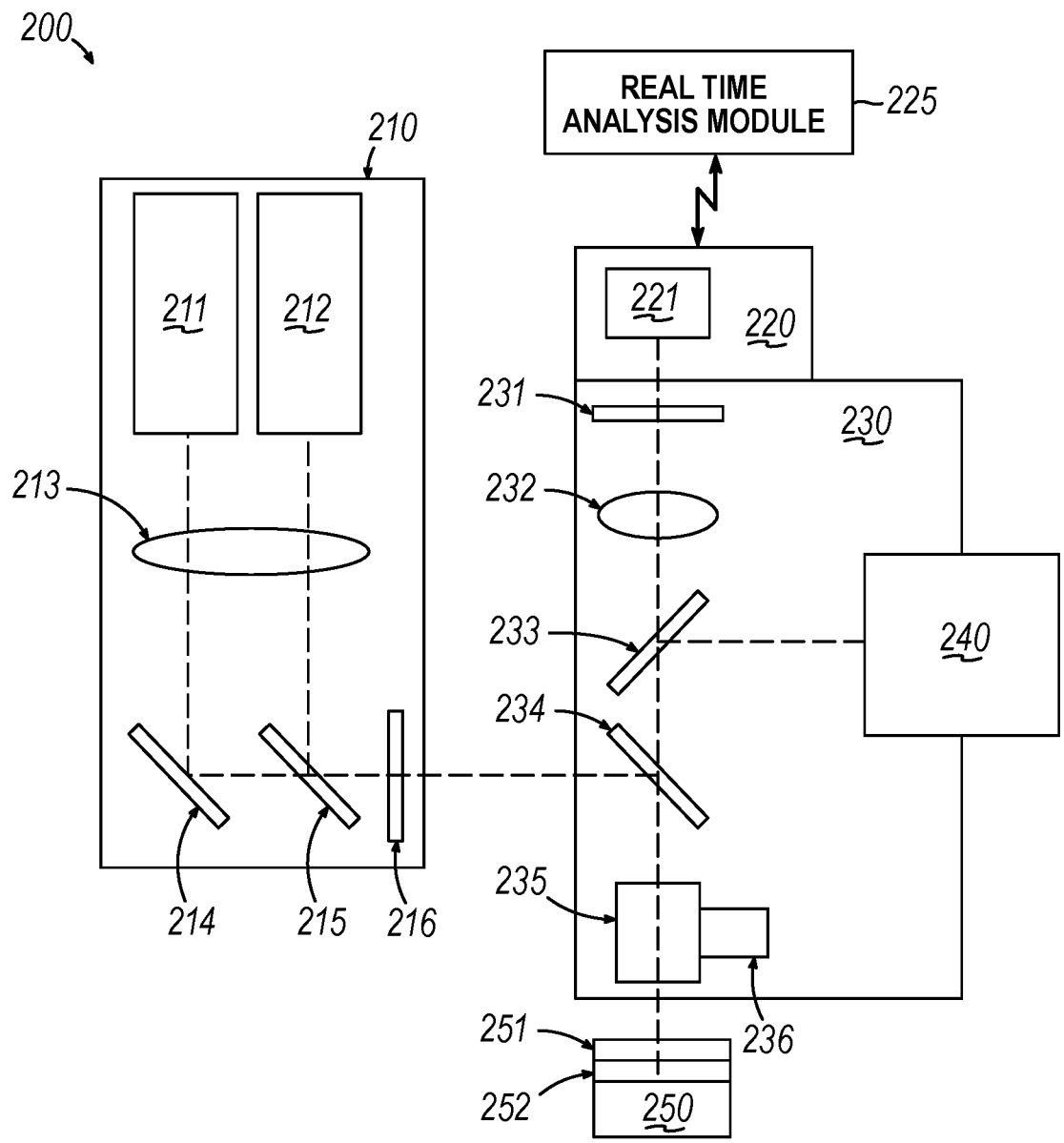
FIG. 2 is block diagram illustrating an example two-channel, line-scanning modular optical imaging system that may be implemented in particular implementations.

Other imaging systems may also be used when implementing the disclosed technology. For example, FIG. 2 is a block diagram illustrating an example two-channel, line-scanning modular optical imaging system 200 in which aspects of the disclosed technology may be implemented. In some implementations, system 200 may be used for the sequencing of nucleic acids. Applicable techniques include those where nucleic acids are attached at fixed locations in an array (e.g., the wells of a flow cell) and the array is imaged repeatedly while in motion relative to the field of view of a camera in the imaging system 200. In such implementations, system 200 may obtain images in two different color channels, which may be used to distinguish a particular nucleotide base type from another More particularly, system 200 may implement a process referred to as "base calling," which generally refers to a process of a determining a base call (e.g., adenine (A), cytosine (C), guanine (G), or thymine (T)) for a given spot location of an image at an imaging cycle. During two-channel base calling, image data extracted from two images may be used to determine the presence of one of four base types by encoding base identity as a combination of the intensities of the two images. For a given spot or location in each of the two images, base identity may be determined based on whether the combination of signal identities is [on, on], [on, off], [off, on], or [off, off].

Referring again to imaging system 200, the system includes a line generation module (LGM) 210 with two light sources, 211 and 212, disposed therein. Light sources 211 and 212 may be coherent light sources such as laser diodes which output laser beams. Light source 211 may emit light in a first wavelength (e.g., a red color wavelength), and light source 212 may emit light in a second wavelength (e.g., a green color wavelength). The light beams output from laser sources 211 and 212 may be directed through a beam shaping lens or lenses 213. In some implementations, a single light shaping lens may be used to shape the light beams output from both light sources. In other implementations, a separate beam shaping lens may be used for each light beam. In some examples, the beam shaping lens is a Powell lens, such that the light beams are shaped into line patterns. The beam shaping lenses of LGM 210 or other optical components imaging system may shape the light emitted by light sources 211 and 212 into a line patterns (e.g., by using one or more Powel lenses, or other beam shaping lenses, diffractive or scattering components).

LGM 210 may further include mirror 214 and semi-reflective mirror 215 to direct the light beams through a single interface port to an emission optics module (EOM) 230. The light beams may pass through a shutter element 216. EOM 230 may include objective 235 and a z-stage 236 which moves objective lens 235 longitudinally closer to or further away from a target 250. For example, target 250 may include a liquid layer 252 and a translucent cover plate 251, and a biological sample may be located at an inside surface of the translucent cover plate as well an inside surface of the substrate layer located below the liquid layer. The z-stage 236 may then move the objective as to focus the light beams onto either inside surface of the flow cell (e.g., focused on the biological sample). Similarly, in some implementations, the target 250 may be mounted on, or include a stage movable in the xy plane relative to the objective lens 235. The biological sample may be DNA, RNA, proteins, or other biological materials responsive to optical sequencing as known in the art.

EOM 230 may include semi-reflective mirror 233 to reflect a focus tracking light beam emitted from a focus tracking module (FTM) 240 onto target 250, and then to reflect light returned from target 250 back into FTM 240. FTM 240 may include a focus tracking optical sensor to detect characteristics of the returned focus tracking light beam and generate a feedback signal to optimize focus of objective 235 on target 250.

EOM 230 may also include semi-reflective mirror 234 to direct light through objective lens 235, while allowing light returned from target 250 to pass through. In some implementations, EOM 230 may include a tube lens 232. Light transmitted through tube lens 232 may pass through filter element 231 and into camera module (CAM) 220. CAM 220 may include one or more optical sensors 221 to detect light emitted from the biological sample in response to the incident light beams (e.g., fluorescence in response to red and green light received from light sources 211 and 212).

Output data from the sensors of CAM 220 may be communicated to a real time analysis module 225. Real time analysis module, in various implementations, executes computer readable instructions for analyzing the image data (e.g., image quality scoring, base calling, etc.), reporting or displaying the characteristics of the beam (e.g., focus, shape, intensity, power, brightness, position) to a graphical user interface (GUI), etc. These operations may be performed in real-time during imaging cycles to minimize downstream analysis time and provide real time feedback and troubleshooting during an imaging run. In implementations, real time analysis module may be a computing device (e.g., computing device 1000) that is communicatively coupled to and controls imaging system 200. In implementations further described below, real time analysis module 225 may additionally execute computer readable instructions for controlling illumination of the target 250 and optionally for integrating data gathered during multiple exposures of the optical sensor(s) 221 into an image.

Figure 3:
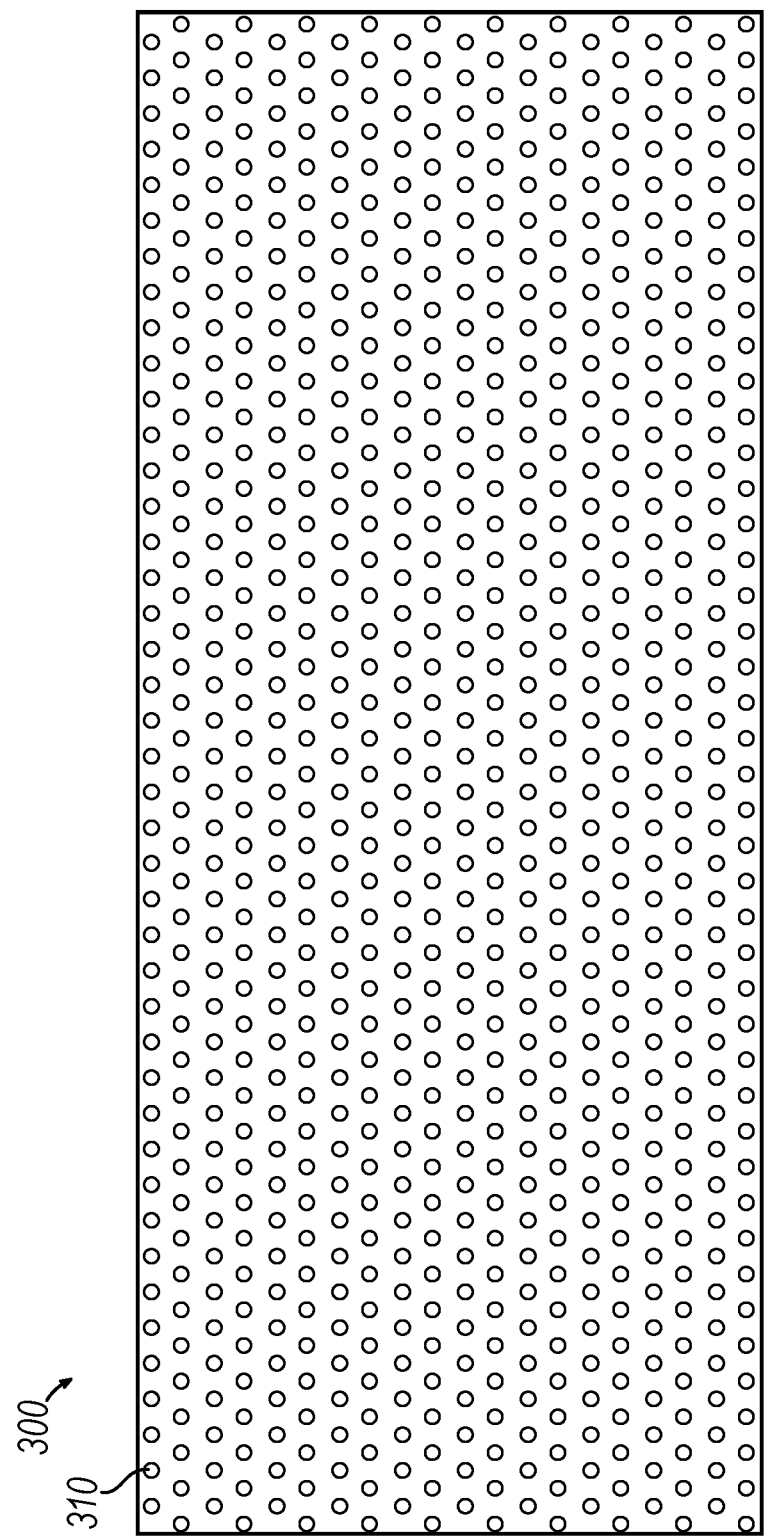
FIG. 3 illustrates an example configuration of a patterned sample that may be imaged in accordance with implementations disclosed herein.

FIG. 3 illustrates an example configuration of a sample container 300 that may be imaged in accordance with implementations disclosed herein. In this example, sample container 300 is patterned with a hexagonal array of ordered spots 310 that may be simultaneously imaged during an imaging run. Although a hexagonal array is illustrated in this example, in other implementations the sample container may be patterned using a rectilinear array, a circular array, an octagonal array, or some other array pattern. For ease of illustration, sample container 300 is illustrated as having tens to hundreds of spots 310. However, as may be appreciated by one having skill in the art, sample container 300 may have thousands, millions, or billions of spots 310 that are imaged. Moreover, in some instances, sample container 300 may be a multi-plane sample comprising multiple planes (perpendicular to focusing direction) of spots 310 that are sampled during an imaging run.

In a particular implementation, sample container 300 may be a flow cell patterned with millions or billions of wells that are divided into lanes. In this particular implementation, each well of the flow cell may contain biological material that is sequenced using sequencing by synthesis.

As discussed above, illumination and imaging of an object in motion relative to the field of view of an imaging device has been accomplished through high precision motion stages, time delay integration (TDI) cameras, and diode pumped solid state lasers. However, implementations of the disclosed technology may achieve the same goal while relaxing the normally tight tolerances and performance requirements which are filled by those types of components. For example, in some implementations, rather than utilizing a TD camera which continuously images a sample container as it moves, a different type of camera, such as a consumer camera using complimentary metal-oxide-semiconductor (CMOS) sensors may be used to capture an image of a sample at a moment in time. In such an implementation, the operation of the implementation's light source(s) (e.g., the light source 160 from FIG. 1 or the light sources 211 212 from FIG. 2) may differ from that of the light source(s) in an implementation which uses a camera that continuously images a moving target.

Figure 4:
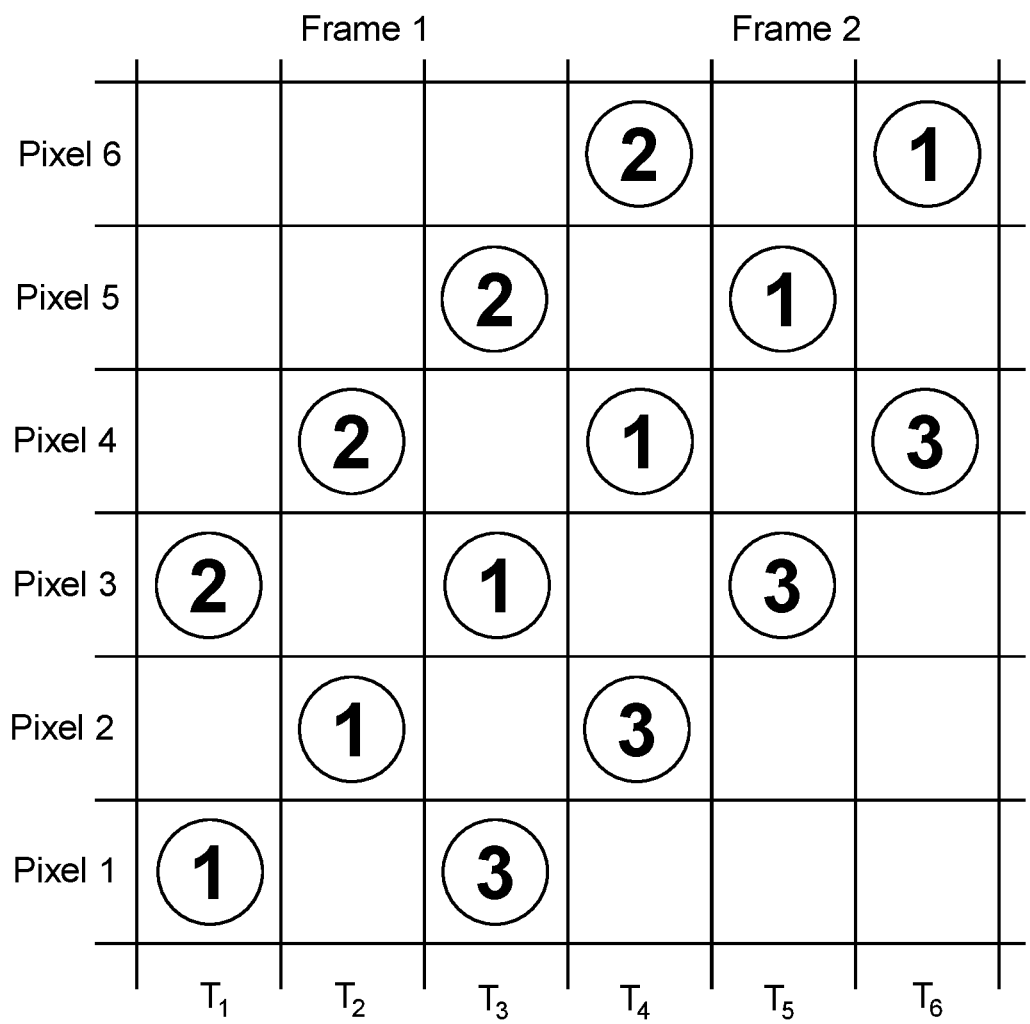
FIG. 4 illustrates an example scenario in which a camera is used to image a sample moving continuously through its field of view.

To illustrate why operations of light source(s) may be modified in an implementation with a camera which captures images of single moments in time, consider the scenario of FIG. 4, in which a camera used to image a sample has a framerate that allows it to capture three exposures while a feature (e.g., nanowell) of the sample container is in its field of view, and a resolution which allows it to split its field of view into 6 pixels in the direction of movement of the sample container. In such a scenario, if the sample container was illuminated continuously while it was in the field of view of the camera (i.e., continuously illuminated from time $T_1$ through time $T_6$), the result may be two blurry images, since the exposure captured during the first frame may include photons from when the feature was in the first pixel the second pixel and the third pixel from the field of view, while the exposure captured during the second frame may include photons from when the feature was in the fourth pixel, the fifth pixel and the sixth pixel from the field of view. This blurriness may result in the images being unusable. For instance, as shown in FIG. 4, if the sample container included three features, and each of those features was separated by a distance of a single pixel, the framerate of the camera may cause photons from multiple features to be comingled (e.g., photons from feature 1 at $T_1$ may be comingled with photons from feature 3 at $T_3$ in frame 1). This may prevent individuals features from being distinguished from each other in the resultant images.

A variety of measures may be taken to address blurring as described above. In some implementations, the distance between features on a sample container in the sample container's direction of motion may be increased, such that photons from multiple features would not be commingled given the framerate of the camera. This increase of the distance between features in the direction of motion may be accompanied by an increase in the spacing perpendicular to the direction of motion, or it may be made only in the direction of motion, with the spacing perpendicular to the direction of motion being left unchanged (or changed in some other manner) If this approach were applied to the scenario of FIG. 4, such as by increasing the distance between features from one pixel to two pixels in the direction of motion of the sample container, then it may be possible to distinguish individual features even despite blurring caused by the framerate of the camera. Similarly, in some implementations, the speed of movement of the sample container may be decreased. For instance, if the speed of motion in the scenario of FIG. 4 were decreased by 50%, then the individual features may be distinguishable from each other in images taken by the camera regardless of blurring caused by the framerate.

It may also be possible to avoid the effects of blurring by using brief periods of illumination rather than continuous illumination of a sample container. For instance, in implementations using one or more laser light source, such as light source 160 from FIG. 1 or the light sources 211 and 212 from FIG. 2, these light sources could be implemented using pulsed lasers rather than continuous wave lasers, or the light sources may be outfitted with additional components such as optical choppers to allow them to provide brief periods of illumination even if operated in continuous wave mode. As described below, these types of approaches may allow for a camera which captures images of a sample container at discrete moments to be used with a continuously moving sample container even when a single pixel of blurriness could render the resulting images unusable. While the description below explains how the use of other than continuous illumination may allow for avoiding a pixel of blurring, the same techniques may also be used in implementations where more than a pixel of blurring is acceptable. For instance, as noted above, one approach to mitigating blurring may be to increase the pitch of features in the direction of motion of a sample container. If this type of pitch expansion was not sufficient to avoid comingling of photons from different features (e.g., if the distance of the blurring within a frame was greater than the pitch) then the approach of expanding the pitch may be combined with the approach of using brief periods of illumination to address this additional blurring. Accordingly, the discussion below should be understood as being illustrative of approaches to addressing blurring using brief periods of illumination, and should not be seen as implying that that approach may only be applied where no more than a pixel of blurring is acceptable.

One approach to avoid the blurring described above while imaging a continuously moving sample container is to illuminate the sample container with a pulse of sufficient intensity to allow the photons necessary for an image to be collected during a period which is brief enough that the distance moved by the sample container while illuminated is less than a pixel. For example, if this type of approach were applied to the scenario of FIG. 4, the sample container may only be illuminated during $T_1$ (or for some other period having the same or shorter duration), rather than being illuminated from $T_1$ through $T_6$ as may be the case in an implementation using a TDI camera or similar device designed to continuously image a target in motion Additionally, the intensity of illumination may be set so that the dose provided during the period $T_1$ is the same as the dose that may be provided from $T_1$ through $T_6$ in an implementation using a TDI camera or similar device designed to continuously image a target in motion. In this way, an implementation following this approach may avoid the blurring which may happen from trying to create an image from photons collected across pixels while still collecting sufficient photons to allow the image captured by the camera to be usable for its intended purpose (e.g., to allow an imaging system such as discussed in the context of FIGS. 1 and 2 to sequence a sample).

Other variations on using brief illumination to avoid blurring are also possible. For example, in some implementations, a sample container may be illuminated with multiple pulses while it is in a camera's field of view, with each pulse illuminating the sample container for a period which is brief enough that the distance moved by the sample container while illuminated by that pulse is less than a pixel. This may be done, for example, to avoid requiring a laser with a high enough power to completely illuminate a feature in less time than it takes to move a distance of one pixel, to account for saturation limits of a dye used in sequencing a sample being imaged, or for other reasons as may apply in a particular situation. In some implementations following this approach, the sample container may be illuminated once for each frame of the camera while it is in the field of view. In this way, multiple exposures may be generated, with each exposure being based only on photons collected from an illumination period too short for the sample container to move a full pixel. To illustrate, if this approach were applied to the scenario of FIG. 4, the sample container may be illuminated in periods $T_1$ and $T_4$. The intensity of the illumination may also be increased in a manner similar to that described above. That is, the intensity of illumination may be set such that the photons collected from each illumination period may allow each exposure to provide a usable image.

It should be understood that the approaches described above, and examples of how those approaches may be applied, are intended to be illustrative only, and that other approaches, and variations on the described approaches, are possible and may be applied in some implementations. To illustrate, consider the intensity of illumination provided in an implementation which illuminates a sample container with multiple brief pulses while it is in a camera's field of view. In some implementations of this type, the intensity of illumination may be set at a level which may not allow a sufficient number of photons to be collected for each exposure to provide a usable image. For example, illumination may be set at a lower intensity to reduce the risk of photodamage caused by repeatedly exposing a sample to high peak power laser illumination or to avoid reaching photo-saturation of a phosphorescent dye used in sequencing a sample. In this type of implementation, a process such as shown in FIG. 5 may be used to allow data from multiple exposures to be combined to obtain (at least) one usable image of the sample.

Figure 5:
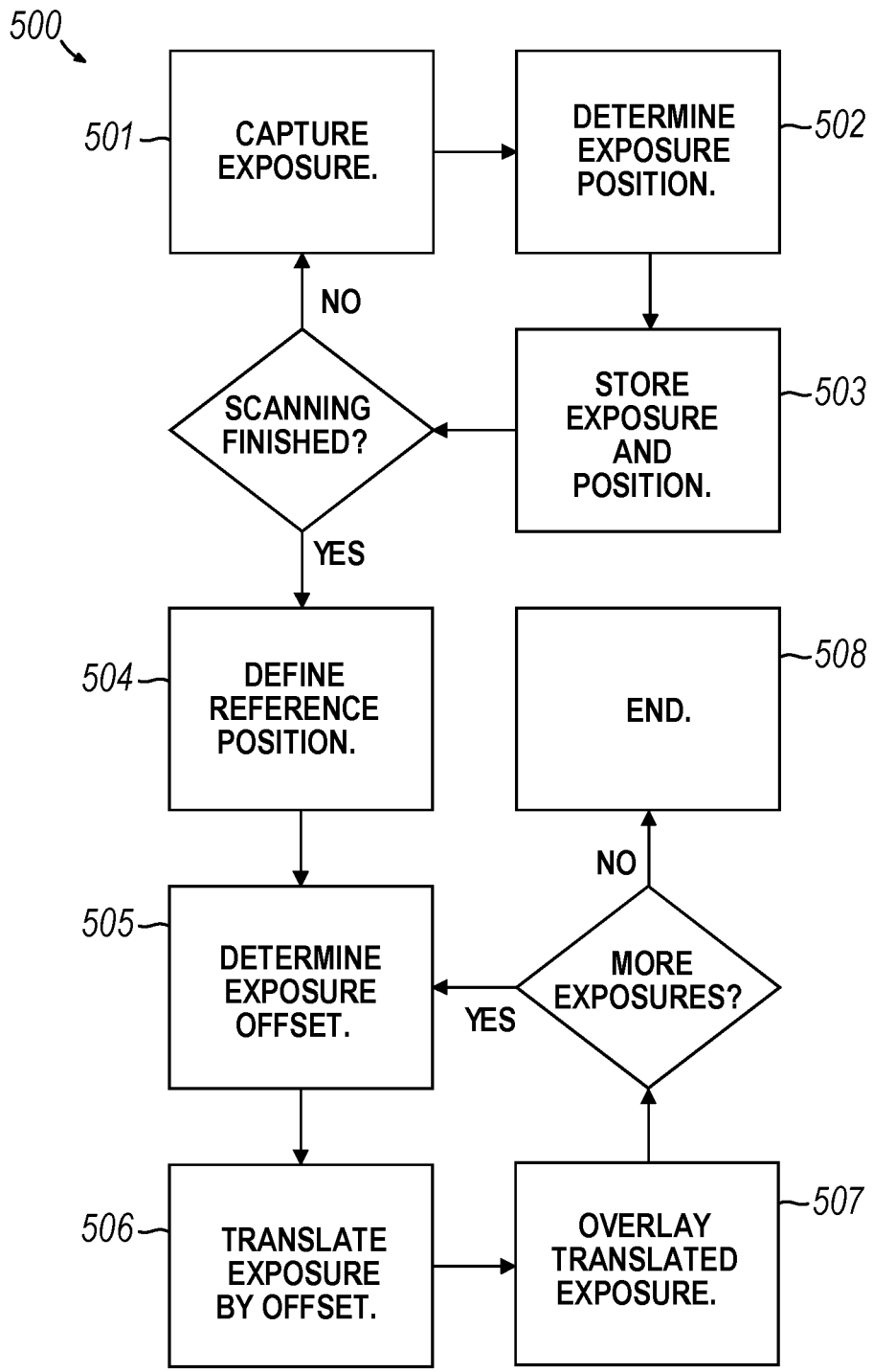
FIG. 5 illustrates an example process in which multiple exposures are combined.

FIG. 5 is a flow diagram illustrating an example method 500 that may be implemented for deriving a usable image from multiple exposures. In the method 500 of FIG. 5, an exposure may be captured at block 501. This may be done, for example, by exposing the sensors of a camera and illuminating a moving sample container for a brief period while it is in the field of view of a camera, as described above in the context of approaches for avoiding blurring. At block 502, the position of the sample container at the time the exposure was captured may be determined. This may be done, for example, by, in a version where a sample container was mounted on a precision motion controlled stage moving at a constant velocity, multiplying the known velocity of the stage by the amount of time that had elapsed in the scanning process when the exposure was captured. This position information, along with the exposure itself, may be stored at block 503. This process may be cycled repeatedly while scanning was ongoing, with each iteration of blocks 501 502 and 503 preferably corresponding to a single frame of the camera being used to capture the exposures.

After scanning was complete, a method 500 such as shown in FIG. 5 may continue in block 504 with defining a reference position. This may be done, for example, by defining the position of the sample container at the time the first exposure was captured as the reference position. Then, with the reference position defined, the offset for an exposure which had not been processed at blocks 505-507 may be determined at block 505. This may be done, for example, by taking a difference between the position stored for the exposure being processed and the reference position stored previously at block 504. At block 506, the exposure being processed may be translated by the offset. This may be done, for example, by adding an offset determined at block 505 to coordinates of data in the exposure being processed. The translated exposure may then be overlaid with the data from any previously processed overlays at block 507. This may be done, for example, by doing a pixel by pixel summation of the data from the translated exposure with the data from any previously processed exposures, taking advantage of the fact that the translation may have put all exposures in a consistent coordinate system defined by the reference position. The operations of blocks 505, 506 and 507 may then be repeated for each exposure. Once all exposures had been overlaid, a method 500 such as shown in FIG. 5 may end at block 508, and the overlay with the combined data from all of the processed exposures may treated as an image of the sample container for further analysis.

Variations on, and modifications to, the method 500 of FIG. 5 are also possible. For example, in some implementations, rather than translating an exposure by an offset through addition as described above in the context of block 506, some implementations may utilize other types of translation. For instance, in an implementation where the position of the sample container at the time an exposure is captured may be determined with sub-pixel accuracy, translation of an exposure such as in block 506 may be achieved by taking a Fourier transform of the exposure to be translated, multiplying the representation of the exposure in frequency space by a complex exponential defined as $\exp(-idk)$ where d is the translation amount and k is the position in frequency space, and then performing an inverse fast Fourier transform on the translated frequency space representation. Similarly, in some implementations where the position of the sample container at the time an exposure is captured may be determined with sub-pixel accuracy, the translation which may be performed at block 506 may include performing a linear interpolation to determine how the sub-pixel measurement may be translated into whole pixel measurement values in the coordinate system defined by the reference position. Other variations, such as scaling up exposures to have a pixel resolution matching the position resolution and using interpolation (e.g., linear, bilinear or cubic interpolation) to fill in data for locations between pixels in the original image before translation are also possible, and may be used in some implementations. Accordingly, the examples described above of varying translation approaches should be understood as being illustrative only, and should not be treated as limiting.

Variations may also be implemented to provide for optimization in representation and/or processing of exposures. To illustrate, consider an implementation in which images of a sample container are captured by a 10 megapixel camera with a framerate of 1000 Hz and a bit depth of 12 bits. In such a case, then the data to be processed may be generated at a rate of 120 gigabits per second. To help mitigate difficulties posed by transferring, storing and processing this amount of data, some implementations may truncate the bit depth of the output provided by the camera based on the amount of illumination provided for each exposure. For example, if the relationship of the framerate of the camera to the velocity of the sample container is such that 125 exposures may be captured of a feature of the sample container while it is in the camera's field of view, then the illumination may be set at a level which may provide each exposure 1/125 of the illumination necessary for a usable image. As a result of this lower level of illumination, none of the pixels from any exposures may have more than six bits of data, and so the six most significant bits of data may be truncated from each pixel of the output of the camera before that output is processed or stored as described previously in the context of FIG. 5. Subsequently, when the exposures are overlaid in block 507, the overlaid image may be encoded at a bit depth of 12 bits per pixel, thereby reflecting all photons captured by the camera even though none of the individual exposures were stored or encoded in a manner which may have stored that data. Similarly, in some implementations, some additional or alternative types of compression may be applied. For instance, in an implementation where extended sequences of bits are commonly repeated (e.g., sequences of zeros) these sequences may be replaced by more compact representations, such as through use of Huffman coding or other types of replacement to reduce the amount of data required to represent the relevant data.

Another type of variation which may be included in some implementations is to add additional processing acts to further account for requirements of components that may be used. For example, in some implementations, a camera may capture images of a sample container using high precision low distortion optics. However, in other implementations, rather than using low distortion optics, additional processing acts may be performed to account for imperfections that may be introduced by capturing exposures using a camera with a less precisely manufactured lens. For instance, in some implementations, prior to using a method such as shown in FIG. 5 to image a sample container, a calibration process may be performed in which the method of FIG. 5 may be used to image a calibration target lithographically patterned with a plurality of holes in known a configuration (e.g., the pattern of features 310 illustrated in FIG. 3). The pattern of holes in the image of the target captured by the camera may then be compared with the known pattern of holes, and a polynomial map representing the warping introduced by imperfections in the camera's lens may be created from this comparison. Subsequently, when the camera was used in imaging the sample container, this polynomial map may be applied to reverse the distortion introduced by the lenses in the image(s) of the sample container, thereby allowing the tolerances normally required for low distortion optics in a system such as shown in FIG. 1 or 2 to be relaxed in some implementations. As another example, in some implementations, a light source may illuminate a sample container with multiple pulses before the distance moved by the sample container reached the size of a pixel in the camera capturing images of the same. This may be used, for instance, if a light source was not able to provide sufficiently intense illumination continuously during the time needed for the sample container to move the distance of one pixel, but may provide multiple higher intensity, but briefer, pulses during that time.

Additional components may also, or alternatively, be included in some implementations to address and/or mitigate the constraints provided by discontinuous illumination. For example, in some cases, image stabilization techniques may be used to make the sample container appear stationary in the camera's field of view, thereby reducing the impact of the container's movement and potentially increasing the amount of time that the container could be illuminated during any frame. This may be done, for instance, by using a motor to shift the camera (or a lens of the camera) in a manner which is synchronized with the movement of the stage, thereby moving the camera's field of view during a frame such that the sample container would appear stationary (or to move a distance of less than one pixel). Alternatively, in some cases which use this type of image stabilization approach, a piezo or galvo mirror may be placed in the path of the emissions from the sample container, again, effectively allowing the camera's field of view to be moved in a manner that counteract the movement of the stage during the portion of a frame when the sample container was illuminated. When the sample container was no longer illuminated, the motor could reset the field of view for the next frame, and this process could be repeated for the duration of an imaging run.

Figure 7A:
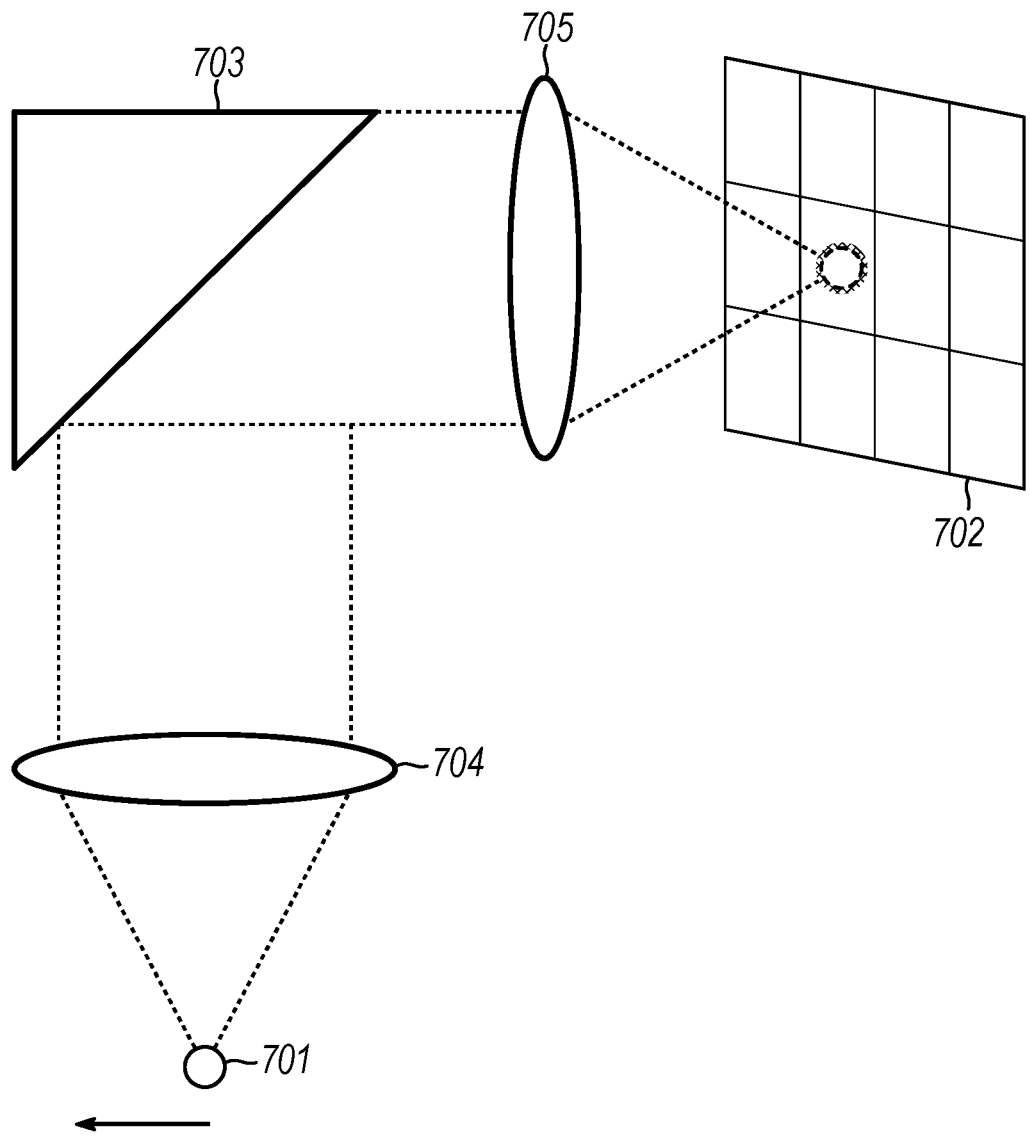
FIGS. 7A-7C illustrate configurations in which illumination from a feature is focused on a camera using lenses and a mirror.
Figure 7B:
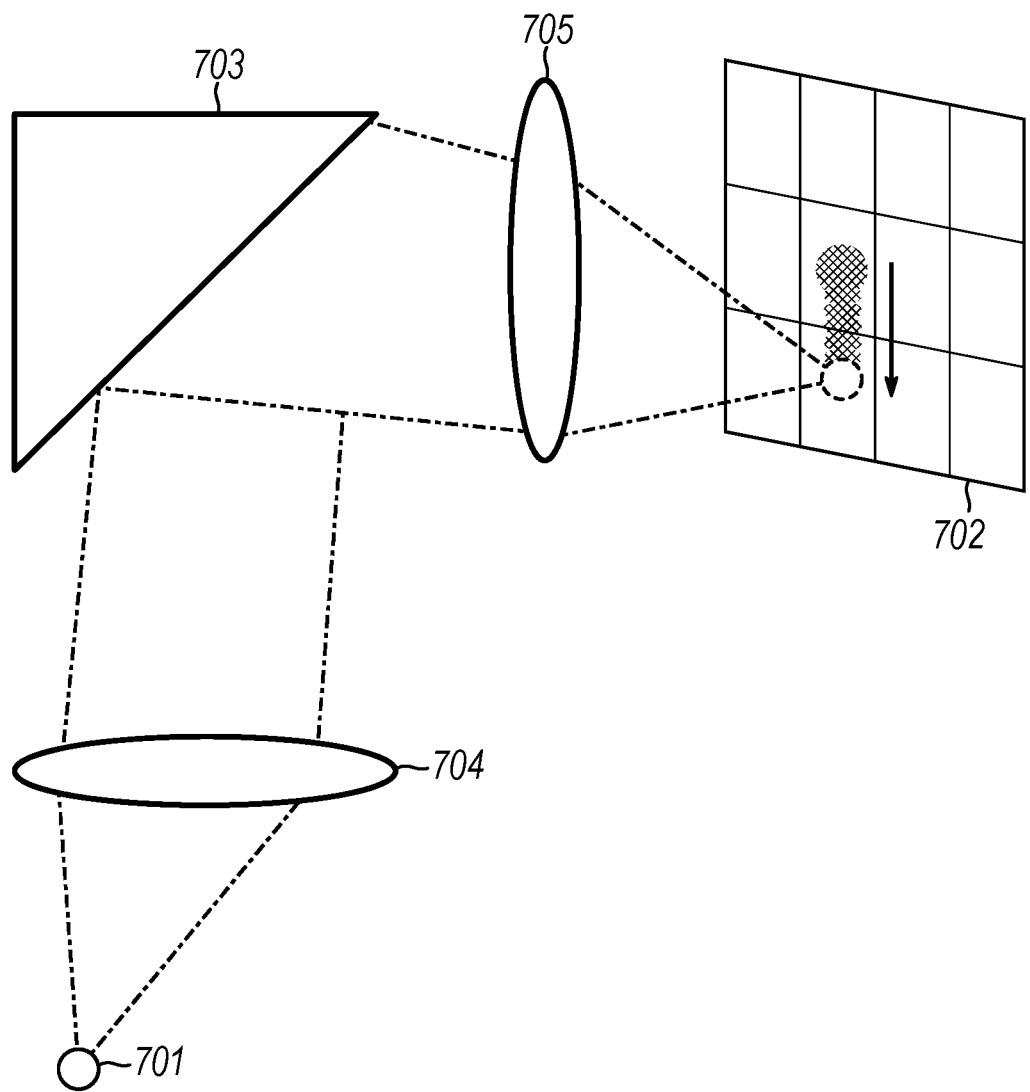
Figure 7C:
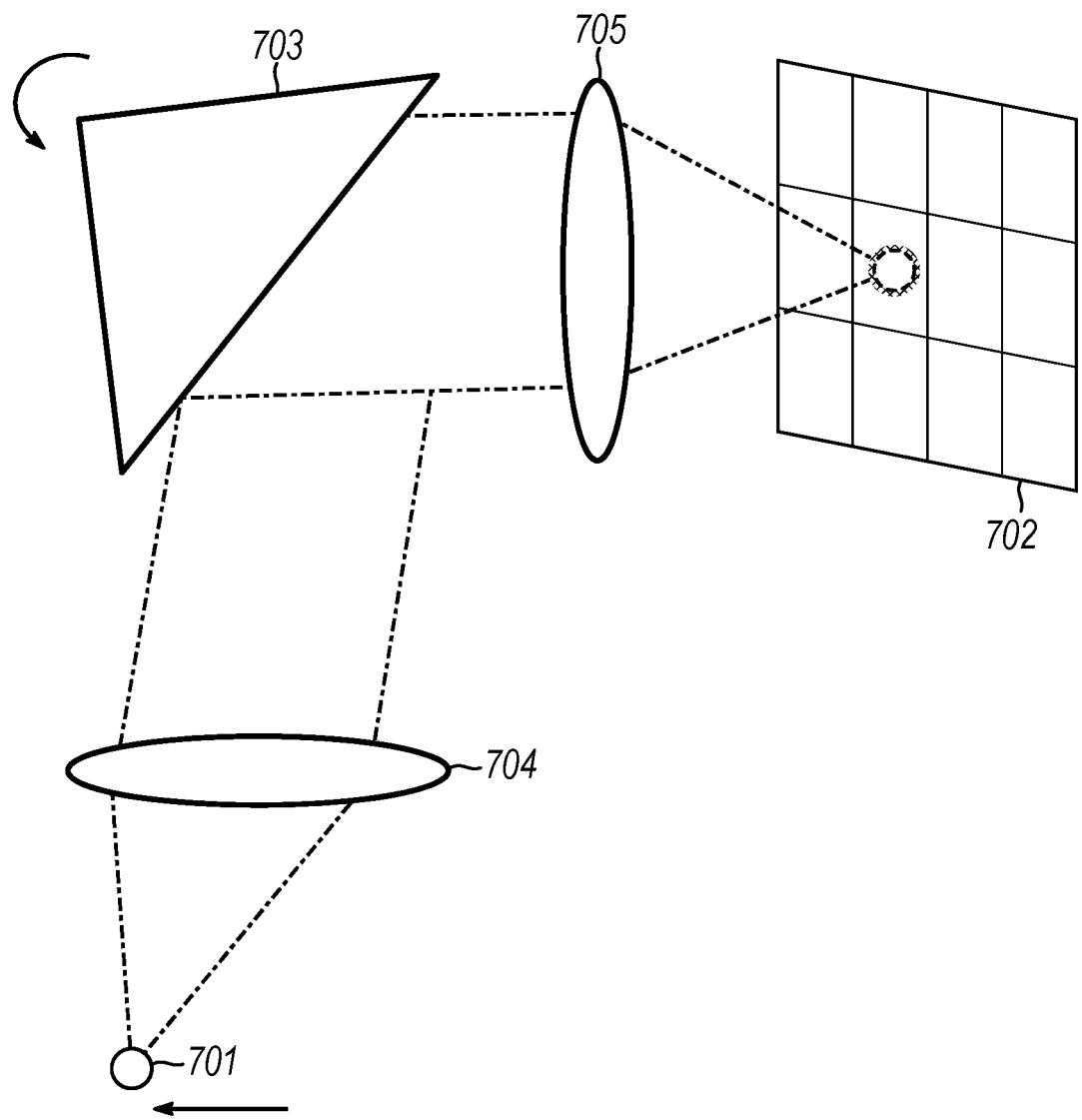

To illustrate a potential implementation of how image stabilization could potentially be used to mitigate the constraints provided by discontinuous illumination, consider FIGS. 7A-7C In those figures, FIG. 7A illustrates a relationship of a feature 701, a camera 702 whose field of view is split into 12 pixels, and a movable mirror (e.g., a galvo mirror) 703 used for image stabilization. In that figure, when light is emitted from the feature, it would be directed to the mirror 703 by a first lens 704 reflected off the mirror 703 to a second lens 705, and focused by the second lens 705 onto a first pixel of the camera 702 where it would be detected. FIG. 7B illustrates a result of the movement of the feature 701 over a distance greater than or equal to the size of a pixel on the camera 702 if the feature had been continuously illuminated, the mirror 703 had remained stationary, and the camera 702 had captured only a single exposure during the period of that movement. As shown in FIG. 7B, this may result in the signal from the feature 701 being spread across multiple pixels on the camera 702, and could potentially result in signal overlap in the event that a second feature (not shown in FIG. 7B) had been adjacent to the feature 701 shown in FIGS. 7A and 7B. By contrast, FIG. 7C shows a result of moving the mirror 703 while the feature 701 moved a distance greater than one pixel on the camera 702. As shown in FIG. 7C, by moving the mirror 703 to compensate for the movement of the feature 701, the light emitted from the feature could be continuously focused on a single pixel, thereby avoiding the blurring shown in FIG. 7B. As described previously this may also be achieved via movement of the camera 702, or a lens used to direct or focus illumination from the feature (e.g., the first lens 704 or the second lens 705 illustrated in FIGS. 7A-7C). Accordingly, the specific configuration and components shown in FIGS. 7A-7C should be understood as being illustrative only, and should not be treated as limiting.

While the above examples and discussion focused on variations on illumination and image capture components, it should be understood that variations in other types of components may be used in some implementations as well. To illustrate, consider stages for moving a sample container through a field of view of an imaging device. In some implementations, the stage may be implemented with components such as cross roller bearings to enable its motion to be precisely controlled (e.g., implementations which determine the position of the sample container when an exposure is captured based on assumptions regarding the uniformity of the stage's motion). However, in other implementations, a stage with less precise motion control may be used, such as a friction based stage or one mounted on the frame of an imaging system with ball bearings, and an additional component, such as an encoder, may be introduced to determine the location of the stage at the specific points in time when exposures of a sample container are captured. In such an implementation, determining the position of an exposure such as illustrated in block 502 of FIG. 5 may be performed by querying the encoder for the position of the stage when the sample container is illuminated for an exposure, rather than by determining the position based on time. Alternative position determination features may also be used. For instance, in some variations, a sample container may be instrumented with a set of bright beads which could operate as fiducial reference points to allow relative positions of the sample container captured in different images to be determined so that features in those images could be co-registered with each other as described above.

Of course, variations on this may also be possible as well. For example, in some implementations, an exposure may be stored with time information, rather than with its position as described in block 503. In this type of implementation, the actual position of the exposure may only be determined subsequently when it is necessary to calculate an offset, such as by multiplying by known movement speed as described previously in the context of block 502, or by matching the time for the exposure against timestamped location information collected from an encoder during scanning. Other variations, such as capturing multiple locations per illumination pulse (e.g., at the beginning and end of the pulse) and then averaging them to obtain a location for the pulse's corresponding exposure, or omitting a position determination and determining exposure offsets by comparing locations of fiducial reference points may also be possible in some implementations. Accordingly, the examples provided above should be understood as being illustrative only, and should not be treated as limiting.

Some implementations may also feature methods which vary from the overall structure of the method of FIG. 5. For example, in some implementations, rather than capturing and storing multiple exposures and then overlaying the previously captured and stored exposures, the determining of offsets, translation of offsets, and the overlaying of translated exposures may be performed in real time on an exposure by exposure basis as each exposure is captured. In such an implementation, acts such as described previously in the context of blocks 501, 502, 504, 505, 506 and 507 may be repeatedly performed while scanning proceeds, potentially allowing a user to see the progress of imaging a sample as exposures are captured.

To further illustrate how aspects of the disclosed technology may be applied in practice, consider a scenario in which a biological sample is split into clusters in nanowells in an array having a pitch length in the direction of movement of 624 nm, and the data captured from the nanowells is to be used for DNA sequencing using sequencing by synthesis. In such a case, if the sample container is to be imaged while moving at 10 mm/s through a 1×1 mm field of view of a 1000 Hz camera, and each pixel in the camera corresponds to a distance of 0.3 µm in the field of view, an implementation using a method such as shown in FIG. 5 may capture 100 exposures of each nanowell while it was in the camera's field of view for each sequencing cycle, based on the framerate of the camera, the field of view of the camera, and the speed of movement of the sample container (i.e., exposures=framerate of camera*length of field of view/speed of movement). Additionally, in such an implementation, the sample container may be illuminated for 0.03 ms or less per exposure, based on the size of the camera's pixels, the movement speed of the sample and the framerate of the camera (i.e., illumination time:=(pixel size/speed of movement)*framerate). In such a scenario, if a threshold dose on the order of 1-5 J/cm$^2$ is necessary to image each nanowell correctly, then an implementation following the method of FIG. 5 may obtain a usable image of the sample for each sequencing cycle by illuminating the sample using a laser having continuous wave power in the range of 3.3-16.5 W in combination with an optical chopper to control the duration of illumination, based on the required dose, field of view (FOV), and the duration of each illumination pulse (i.e., power=dose*FOV area/pulse duration). This may be provided in a variety of ways, including diode pumped solid state (DPSS) lasers as described previously, or using less expensive components, such as diode lasers. These images may then be used to identify the sequences of nucleotides in the cluster in each nanowell, and those clusters may then be combined as they may be in preexisting sequencing by synthesis such as may be performed using data gathered using continuous illumination of a sample.

FIG. 6 illustrates an example computing component that may be used to implement various features of the system and methods disclosed herein, such as the aforementioned features and functionality of one or more aspects of methods 400 and 450. For example, computing component may be implemented as a real-time analysis module 225.

As used herein, the term module may describe a given unit of functionality that may be performed in accordance with one or more implementations of the present application. As used herein, a module may be implemented utilizing any form of hardware, software, or a combination thereof. For example, one or more processors, controllers, ASICs, PLAs, PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as may be apparent to one of ordinary skill in the art after reading this description, the various features and functionality described herein may be implemented in any given application and may be implemented in one or more separate or shared modules in various combinations and permutations Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality.

Where components or modules of the application are implemented in whole or in part using software, in one implementation, these software elements may be implemented to operate with a computing or processing module capable of carrying out the functionality described with respect thereto. One such example computing module is shown in FIG. 6. Various implementations are described in terms of this example-computing module 1000. After reading this description, it will become apparent to a person skilled in the relevant art how to implement the application using other computing modules or architectures.

Referring now to FIG. 6, computing module 1000 may represent, for example, computing or processing capabilities found within desktop, laptop, notebook, and tablet computers, hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1000 may also represent computing capabilities embedded within or otherwise available to a given device. For example, a computing module may be found in other electronic devices such as, for example, digital cameras, navigation systems, cellular telephones, portable computing devices, modems, routers, WAPs, terminals and other electronic devices that may include some form of processing capability.

Computing module 1000 may include, for example, one or more processors, controllers, control modules, or other processing devices, such as a processor 1004. Processor 1004 may be implemented using a general-purpose or special-purpose processing engine such as, for example, a microprocessor, controller, or other control logic. In the illustrated example, processor 1004 is connected to a bus 1002, although any communication medium may be used to facilitate interaction with other components of computing module 1000 or to communicate externally.

Computing module 1000 may also include one or more memory modules, referred to herein as main memory 1008. For example, preferably random access memory (RAM) or other dynamic memory, may be used for storing information and instructions to be executed by processor 1004. Main memory 1008 may also be used for storing temporary variables or other intermediate information during execution of instructions to be executed by processor 1004. Computing module 1000 may likewise include a read only memory ("ROM") or other static storage device coupled to bus 1002 for storing static information and instructions for processor 1004.

The computing module 1000 may also include one or more various forms of information storage mechanism 1010, which may include, for example, a media drive 1012 and a storage unit interface 1020. The media drive 1012 may include a drive or other mechanism to support fixed or removable storage media 1014. For example, a hard disk drive, a solid state drive, a magnetic tape drive, an optical disk drive, a CD or DVD drive (R or RW), or other removable or fixed media drive may be provided. Accordingly, storage media 1014 may include, for example, a hard disk, a solid state drive, magnetic tape, cartridge, optical disk, a CD, DVD, or Blu-ray, or other fixed or removable medium that is read by, written to or accessed by media drive 1012. As these examples illustrate, the storage media 1014 may include a computer usable storage medium having stored therein computer software or data.

In alternative implementations, information storage mechanism 1010 may include other similar instrumentalities for allowing computer programs or other instructions or data to be loaded into computing module 1000. Such instrumentalities may include, for example, a fixed or removable storage unit 1022 and an interface 1020. Examples of such storage units 1022 and interfaces 1020 may include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 may also include a communications interface 1024. Communications interface 1024 may be used to allow software and data to be transferred between computing module 1000 and external devices. Examples of communications interface 1024 may include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 may typically be carried on signals, which may be electronic, electromagnetic (which includes optical) or other signals capable of being exchanged by a given communications interface 1024. These signals may be provided to communications interface 1024 via a channel 1028. This channel 1028 may carry signals and may be implemented using a wired or wireless communication medium. Some examples of a channel may include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1008, storage unit 1022, and media 1014. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings) When executed, such instructions may enable the computing module 1000 to perform features or functions of the present application as discussed herein.

In the claims, the phrase "means for obtaining an analysis image of a continuously moving sample using pulsed illumination" should be understood as a means plus function limitation as provided for in 35 U.S.C. § 112(f) in which the function is obtaining an analysis image of a continuously moving sample using pulsed illumination, and the corresponding structure is an illumination source, a camera, a moving stage, and a computer as described in the context of FIG. 4 to cause sub-pixel illumination pulses and otherwise avoid blurring as may be caused by continuous illumination.

In the claims, the phrase "means for translating and overlaying multiple sub-threshold exposures" should be understood as a means plus function limitations as provided for in 35 U.S.C. § 112(f) in which the function is "translating and overlaying multiple sub-threshold exposures" and the corresponding structure is a computer to perform acts as described in the context of blocks 505-507 of FIG. 5, as well as the variations on those acts described above as being included in some implementations.

Although described above in terms of various implementations and implementations, it should be understood that the various features, aspects and functionality described in one or more of the individual implementations are not limited in their applicability to the particular implementation with which they are described, but instead may be applied, alone or in various combinations, to one or more of the other implementations of the application, whether or not such implementations are described and whether or not such features are presented as being a part of a described implementation. Thus, the breadth and scope of protection provided by this document or any related document should not be limited by any of the above-described implementations.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The terms "substantially" and "about" used throughout this disclosure, including the claims, are used to describe and account for small fluctuations, such as due to variations in processing. For example, they may refer to less than or equal to 5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first." "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide instances of the item in discussion, not an exhaustive or limiting list thereof; the terms "a" or "an" should be read as meaning "at least one," "one or more" or the like; and adjectives such as "preexisting," "traditional," "normal," "standard," "known" and terms of similar meaning should not be construed as limiting the item described to a given time period or to an item available as of a given time, but instead should be read to encompass preexisting, traditional, normal, or standard technologies that may be available or known now or at any time in the future. Likewise, where this document refers to technologies that may be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various implementations set forth herein are described in terms of block diagrams, flow charts and other illustrations. As will become apparent to one of ordinary skill in the art after reading this document, the illustrated implementations and their various alternatives may be implemented without confinement to the illustrated examples. For example, block diagrams and their accompanying description should not be construed as mandating a particular architecture or configuration.

While various implementations of the present disclosure have been described above, it should be understood that they have been presented by way of example only, and not of limitation. Likewise, the various diagrams may depict an example architectural or other configuration for the disclosure, which is done to aid in understanding the features and functionality that may be included in the disclosure. The disclosure is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present disclosure. Also, a multitude of different constituent module names other than those depicted herein may be applied to the various partitions. Additionally, with regard to flow diagrams, operational descriptions and method claims, the order in which the acts are presented herein shall not mandate that various implementations be implemented to perform the recited functionality in the same order unless the context dictates otherwise.

What is claimed is:

1. A machine comprising:
a camera to capture images comprising pixels, each of which has a pixel size corresponding to a distance on a stage in a direction of movement of a sample container;
the stage to move the sample container relative to a field of view of the camera which overlaps the stage, wherein the sample container comprises an array of features having a pitch length in a direction of movement of the sample container;
an illumination source to illuminate the field of view of the camera; and
a controller to obtain an analysis image by performing acts comprising, while a feature from the array of features is in, and is in motion relative to, the field of view of the camera, obtaining one or more exposures of the feature by, for each of the one or more exposures, performing acts comprising:
exposing a sensor of the camera to illumination for a first duration; and
during a period having a second duration and which takes place while the sensor of the camera is exposed to illumination, illuminating the field of view of the camera with the illumination source;
wherein the feature's displacement in the field of view of the camera from beginning to end of the period having the second duration is less than or equal to the pitch length in the direction of movement of the sample container;
wherein:
the analysis image is one of a plurality of analysis images;
the controller is to perform a plurality of sequencing cycles, wherein each analysis image from the plurality of analysis images corresponds to a single sequencing cycle; and
the controller is to determine a cluster polynucleotide for each feature in the sample container based on the plurality of analysis images; and
the controller is to determine a complete polynucleotide for a sample associated with the sample container based on the cluster polynucleotides determined for the features from the sample container.

2. The machine of claim 1, wherein the feature's displacement in the direction of movement of the sample container in the field of view of the camera from beginning to end of the period having the second duration is less than or equal to the pixel size.

3. The machine of claim 1, wherein:
obtaining one or more exposures of the feature comprises obtaining a plurality of exposures of the feature;
the acts the controller is to perform comprise overlaying the plurality of exposures of the feature based on translating one or more of the plurality of exposures of the feature.

4. The machine of claim 3, wherein:
the analysis image comprises a plurality of pixels, each having a first bit depth; and
each of the plurality of exposures comprises a plurality of pixels, each of which has a second bit depth, wherein the second bit depth is less than the first bit depth.

5. The machine of claim 4, wherein:
each pixel comprised by each image captured by the camera has third bit depth, wherein the third bit depth is greater than the second bit depth;

obtaining the plurality of exposures of the feature comprises, for each exposure:
  capturing an image with the camera while the field of view of the camera is illuminated by the illumination source; and
  truncating a number of most significant bits of the pixels from the image captured by the camera, wherein the truncated number of most significant bits is equal to the difference between the third bit depth and the second bit depth.

6. The machine of claim 1, wherein:
a threshold illumination energy dose is required for imaging the feature;
for each of the one or more exposures of the feature, illuminating the field of view of the camera with the illumination source comprises activating the illumination source at a power which:
  when multiplied by the second duration, provides an individual exposure energy dose less than the threshold illumination energy dose for imaging the feature; and
  when multiplied by the second duration and multiplied by the number of exposures in the plurality of exposures of the feature, provides a collective exposure energy dose greater than the threshold illumination energy dose for imaging the feature.

7. The machine of claim 1, wherein:
the stage is mounted on a frame of the machine using ball bearings;
the camera is to capture images using complementary metal-oxide-semiconductor sensors; and
the illumination source is a diode laser.

8. The machine of claim 1, wherein the machine comprises a motor to counteract movement of the stage by translating the field of view of the camera in the direction of movement of the sample container during the period having the second duration.

9. A method comprising:
translating, in a direction of movement, a feature on a stage relative to a field of view of a camera, wherein the camera has a pixel size corresponding to a distance in the direction of movement on the stage, wherein the feature is comprised by an array of features in a sample container, the array of features having a pitch length in the direction of movement;
generating an analysis image by performing acts comprising, while the feature is in, and is in motion relative to, the field of view of the camera, obtaining one or more exposures of the feature by, for each of the one or more exposures, performing acts comprising:
  exposing a sensor of the camera to illumination for a first duration;
  during a period having a second duration and which takes place while the sensor of the camera is exposed to illumination, illuminating the field of view of the camera with an illumination source;
  wherein the feature's displacement of the field of view of the camera from beginning to end of the period having the second duration is less than or equal to the pitch length in the direction of movement;
wherein:
  the analysis image is one of a plurality of analysis images;
  the method comprises:
    performing a plurality of sequencing cycles, wherein each analysis image from the plurality of analysis images corresponds to a single sequencing cycle;
    determining a cluster polynucleotide for each feature in the sample container based on the plurality of analysis images; and
    determining a complete polynucleotide for a sample associated with the sample container based on the cluster polynucleotides determined for the features from the sample container.

10. The method of claim 9, wherein the feature's displacement in the direction of movement from beginning to end of the period having the second duration is less than or equal to the pixel size.

11. The method of claim 9, wherein:
obtaining one or more exposures of the feature comprises obtaining a plurality of exposures of the feature;
the method comprises overlaying the plurality of exposures of the feature to create the analysis image of the feature by performing acts comprising translating one or more of the plurality of exposures of the feature.

12. The method of claim 11, wherein:
the analysis image comprises a plurality of pixels, each having a first bit depth; and
each of the plurality of exposures comprises a plurality of pixels, each of which has a second bit depth, wherein the second bit depth is less than the first bit depth.

13. The method of claim 12, wherein:
each pixel comprised by each image captured by the camera has third bit depth, wherein the third bit depth is greater than the second bit depth;
obtaining the plurality of exposures of the feature comprises, for each exposure:
  capturing an image with the camera while the field of view of the camera is illuminated by the illumination source; and
  truncating a number of most significant bits of the pixels from the image captured by the camera, wherein the truncated number of most significant bits is equal to the difference between the third bit depth and the second bit depth.

14. The method of claim 9, wherein:
a threshold illumination energy dose is required for imaging the feature;
for each of the one or more exposures of the feature, illuminating the field of view of the camera with the illumination source comprises activating the illumination source at a power which:
  when multiplied by the second duration, provides an individual exposure energy dose less than the threshold illumination energy dose for imaging the feature; and
  when multiplied by the second duration and multiplied by the number of exposures in the plurality of exposures, provides a collective exposure energy dose greater than the threshold illumination energy dose for imaging the feature.

15. The method of claim 9, wherein:
the stage is mounted on a stationary frame using ball bearings;
the camera is to capture images using complimentary metal-oxide-semiconductor sensors; and
the illumination source is a diode laser.

16. The method of claim 9, wherein the method comprises a motor counteracting movement of the stage by translating the field of view of the camera in the direction of movement during the period having the second duration.

* * * * *